Patented July 11, 1939

2,165,589

UNITED STATES PATENT OFFICE 2,165,589

VULCANIZED RUBBER COMPOSITIONS

Henry B. Townsend, Belmont, Mass., assignor to Vultex Chemical Company, Cambridge, Mass., a corporation of Massachusetts No Drawing. Application August 9, 1937, Serial No. 158,142

6 Claims. (Cl. 134—17)

My invention relates to a slightly tacky, plastic vulcanized rubber.

Unvulcanized rubber may be plasticized and also rendered tacky by working on a rubber mill, but these properties of plasticity and tackiness are gradually lost with increasing vulcanization. Any appreciable degree of vulcanization, such as that usual for ordinary soft rubber goods, renders the loss of plasticity and tack on the mill substantially complete. For some classes of rubber materials and for some uses, it is highly desirable to have a vulcanized rubber which is both slightly tacky and plastic.

For example, a rubber can sealing composition which may be used on containers for oily or greasy materials must be vulcanized to a substantial degree in order to destroy substantially the solubility of the rubber in the oily or greasy contents which would soon destroy an unvulcanized rubber seal. Such rubber sealing compositions, when vulcanized enough to withstand the solvent or swelling action of oil or grease, are usually, however, highly elastic and resilient, and lack tackiness and the capacity for plastic flow. This is true of rubber compositions vulcanized with ultra-accelerators at low temperatures, or at high temperatures for a very short time.

The sealing composition should have the property of plastic flow so that it may adjust itself to the inequalities in the space between the container end and the container body on the application of one of these members to the other. If it is slightly tacky it will adhere well to the container members defining the space to be sealed, so that the seal as a whole may expand and contract with the unequal expansion and contraction of the container ends and the container body on barometric or temperature changes.

Another example would be a rubber composition for use in plying together one or more webs of textile material. For such purpose the rubber should be vulcanized to reduce the susceptibility to changes in temperature and to increase its resistance to the swelling or solvent action of oils and greases. A rubber composition vulcanized well enough for these purposes will have no tack and will result in a rather harsh and stiff plied material. It is obvious that such a composition, if tacky and plastic, will be superior to one that is not, for not only will there be better adhesion between the plied textile webs, but the composite material itself will be softer and less harsh.

A third example would be a rubber composition for use in bookbinding or in the manufacture of blocks or tablets of paper, where the composition is used to hold together one edge of a plurality of sheets of paper. Vulcanization of such a composition is desirable to reduce its susceptibility to temperature changes so that it will not flow in hot weather and be very stiff and brittle in cold weather. Vulcanization will also improve the aging qualities, an improvement which in bookbinding and tabbing can not be secured by the use of anti-oxidants which discolor the material.

It is an object of my invention to modify the properties of well vulcanized rubber so that it may be slightly tacky and somewhat plastic for the uses and purposes hereinbefore named, as well as any other use or purpose where such material might be desirable. I have discovered that either of the resins albane or fluavil, or a mixture, when present in their natural state or condition in vulcanized rubber, impart to it the qualities of slight tackiness and plasticity.

To attain my object I prefer to add the resins in the form of an emulsion to a latex which has been vulcanized either partially or completely. If the resins were milled into raw rubber, which is later vulcanized, they would themselves be changed in the vulcanization process. The vulcanization of such a composition, especially an ultra-accelerated one, is furthermore rendered more difficult by the presence of the resins. In any event, the change in the resins when subjected to vulcanization time and temperature in the presence of sulfur, renders them incapable of imparting to the vulcanized rubber the properties of slight tackiness and plasticity. For the same reason I do not recommend the addition of these materials to latex which is subsequently vulcanized after the addition, but prefer to incorporate them in latex already vulcanized at least in part. After vulcanization has been started it will proceed rapidly to completion at times and temperatures which will not affect the resins substantially.

When I refer to "partial" vulcanization, I mean vulcanization short of that which is the optimum amount for the particular compound and for the particular purpose for which it is to be applied or used, and by "complete" vulcanization I mean that degree of vulcanization which is optimum for the particular compound and its particular contemplated use.

One preferred embodiment of my new composition for can sealing is the following:

Vulcanizable latex

| | |
|---|---|
| 40% latex | 100 parts (on dry basis) |
| Zinc oxide | $\frac{3}{16}$ part |
| Sulfur | ¼ part |
| Pipsol X | 1 part |

Pipsol X is a trade marked product the exact composition of which is unknown but which in its accelerating action and chemical composition closely resembles piperidine piperidyl dithio carbamate.

This vulcanizable latex is then vulcanized by heat; one and one-half hour rise to 170° F., dwell for one hour at 170° F., cool for one hour to 110°

F. After cooling it is centrifuged to a 60% concentration.

Resin emulsion

| | |
|---|---|
| Albane | 1 pound 2.8 oz. |
| Fluavil | 1 pound 2.8 oz. |
| Ammonium linoleate | 3.7 oz. |

These materials are blended with heat. Thereafter the blend is mixed with high speed agitation with 2.25 oz. of ammonia and 2 pounds of water at 150° F. Agitation is continued until a smooth emulsion is formed.

Can sealing composition

The resin emulsion is stirred into the 60% vulcanized latex in the following proportions:

| | |
|---|---|
| Vulcanized latex | 4 pounds 4.8 oz. |
| Ammonia water ($\frac{4}{10}$ normal) | 7.4 oz. |
| 50% resin emulsion | 2 pounds 9.9 oz. |

This formulation has proven to be an excellent one for sealing friction top cans, sometimes called contact seal or triple plug top cans, containing lacquers, paints, oily or greasy materials. The seal remains intact for very long periods of time under varying weather conditions.

If films of the can sealing composition are made in the usual way for test purposes by evaporation on glass plates, it will be found that films containing as much as 64% of resin are nevertheless strong and snappy with a low permanent set. The resins in my preferred composition will be found to have reduced the tensile strength somewhat but not enough to make any practical difference for the uses enumerated. I do not recommend a higher resin content than 64% on the rubber, nor one lower than 16%. A lower resin content will not appreciably modify the characteristics of vulcanized rubber towards tackiness and plasticity.

The principal function of the fluavil which is an amorphous resin is to give tack and plasticity to the vulcanized rubber; that of the albane which is a crystalline resin is to maintain the rubber strong and snappy without decreasing the tack and plasticity imparted by the fluavil, although albane will appreciably produce plasticity in vulcanized rubber but not tack. It is obvious therefore that the proportions of albane and fluavil may be considerably modified. Where tack and plasticity should be relatively high and strength and snappiness are not desiderata, fluavil alone may be used. Where strength and snappiness should be high with some plasticity, albane alone may be used. All other possible combinations of strength, snappiness, tack and plasticity may be obtained by suitable use of both resins in differing proportions. A simple experimental trial or two enables one to determine the proper resins and their proportions for any particular use.

Any vulcanized artificial aqueous dispersion of crude rubber is a full equivalent for vulcanized natural rubber latex within the purview of my invention. In the appended claims I use the term "rubber latex" to include both the natural and artificial dispersions of crude rubber. I use the term "vulcanized" to include not only completely vulcanized latex, but also latex which has been vulcanized to any appreciable extent, that is to say, latex containing crude rubber particles which have appreciably or detectably been changed in any or more of the qualities of crude rubber.

I claim:

1. A composition of matter substantially free of the balata hydrocarbon and comprising vulcanized rubber latex, and fluavil substantially unchanged by interaction with sulfur.

2. A composition of matter substantially free of the balata hydrocarbon and comprising vulcanized rubber latex and albane substantially unchanged by interaction with sulfur.

3. A composition of matter substantially free of the balata hydrocarbon and comprising vulcanized rubber latex, fluavil and albane substantially unchanged by interaction with sulfur.

4. A can sealing composition substantially free of the balata hydrocarbon and comprising vulcanized rubber latex admixed with 12½% of albane and 12½% of fluavil calculated as percentages on the quantity of dry rubber.

5. A can sealing composition substantially free of the balata hydrocarbon and comprising vulcanized rubber latex admixed with 16% to 64% of fluavil calculated as percentages on the quantity of dry rubber.

6. A can sealing composition substantially free of the balata hydrocarbon and comprising vulcanized rubber latex admixed with 16% to 64% of albane calculated as percentages on the quantity of dry rubber.

HENRY B. TOWNSEND.